(12) United States Patent
Gerst (10) Patent No.: US 9,272,741 B2
(45) Date of Patent: Mar. 1, 2016

(54) TRAILER SIDE SKIRT ASSEMBLY

(71) Applicant: Fleet Engineers, Inc., Muskegon, MI (US)

(72) Inventor: Thomas Gerst, Twin Lake, MI (US)

(73) Assignee: Fleet Engineers, Inc., Muskegon, MI (US)

( * ) Notice: Subject to any disclaimer, the term of this patent is extended or adjusted under 35 U.S.C. 154(b) by 0 days.

(21) Appl. No.: 14/244,056

(22) Filed: Apr. 3, 2014

(65) Prior Publication Data

US 2014/0300134 A1 Oct. 9, 2014

Related U.S. Application Data

(60) Provisional application No. 61/808,336, filed on Apr. 4, 2013.

(51) Int. Cl.
*B62D 35/00* (2006.01)

(52) U.S. Cl.
CPC ..................................... *B62D 35/001* (2013.01)

(58) Field of Classification Search
CPC .............................. B62D 35/001; B62D 35/00
USPC ......................................................... 296/180.4
See application file for complete search history.

(56) References Cited

U.S. PATENT DOCUMENTS

| 4,746,160 | A | 5/1988 | Wiesemeyer | |
|---|---|---|---|---|
| 7,093,889 | B2 | 8/2006 | Graham | |
| 7,578,541 | B2 | 8/2009 | Layfield et al. | |
| 7,887,120 | B2 | 2/2011 | Boivin et al. | |
| 2007/0120397 | A1* | 5/2007 | Layfield et al. | 296/180.4 |
| 2011/0062749 | A1* | 3/2011 | Graham et al. | 296/180.4 |

* cited by examiner

*Primary Examiner* — Glenn Dayoan
*Assistant Examiner* — Melissa A Black
(74) *Attorney, Agent, or Firm* — McGarry Bair PC (57) ABSTRACT

A side skirt assembly for a trailer of a tractor-trailer includes a skirt panel and a plurality of skirt mounts that couple the skirt panel to the frame of the trailer. The skirt panel can be formed by a layered composite formed of alternating layers of fiberglass and layers containing recycled fiberglass. The position of the skirt mount can be laterally adjusted along the trailer frame whereby the skirt panel can be mounted to the trailer in more than one lateral position. Additionally, the skirt panel can include a track extending along at least a portion of the skirt panel length, and the track can slide relative to the skirt mount to adjust the longitudinal position of the skirt panel on the trailer during assembly.

14 Claims, 8 Drawing Sheets

TRAILER SIDE SKIRT ASSEMBLY

CROSS-REFERENCE TO RELATED APPLICATION

This application claims the benefit of U.S. Patent Application No. 61/808,336, filed Apr. 4, 2013, which is incorporated herein by reference in its entirety.

BACKGROUND

To improve aerodynamics and increase fuel efficiency, a trailer of a tractor-trailer can include a side skirt mounted to the bottom frame of the trailer and extending vertically downward from the trailer towards the ground on both sides of the trailer. The side skirt is often arranged in a straight configuration generally parallel to the side walls of the trailer or an angled configuration extending inward from the side wall of the trailer towards one of the trailer landing gears.

SUMMARY OF THE INVENTION

The invention relates to a side skirt assembly for attachment to a trailer of a tractor-trailer, particularly to a trailer frame comprising lateral rails extending between sides of the trailer. In one embodiment, the side skirt assembly comprises an elongated skirt panel having an inner surface and an outer surface; an elongated track located on the skirt panel inner surface proximate an upper edge of the skirt panel; and one or more skirt mounts configured to mount the skirt panel to a corresponding one or more frame rails, the skirt mount including a bracket with a tab that is received within the track and a coupler [that mounts the bracket to the frame rail.

The track may comprise a central, generally flat portion between upper and lower angled portions, and the bracket may have a body that extends generally perpendicular to the tab and includes a slit extending into the body adjacent the tab. The tab may sit in the track at the central portion, and the slit may receive the lower angled portion of the track.

The bracket may include a wall generally perpendicular to the body and below the tab, wherein the tab and the wall form a space therebetween in communication with the slit such that the track lower angled portion can enter the slit through the space. The tab and the wall may both include at least one opening and can be secured to the skirt panel with fasteners that extend through the openings. The bracket may be a body having a generally right triangular shape with two sides orthogonal to each other, and the tab and the coupler may be located on different sides of the body.

The coupler may comprise a pair of clamping portions that clamp onto one of the trailer frame rails. The clamping portions may each include a C-shaped grip that is configured to hold onto a side of a lower flange of an I-beam type trailer frame rail. One of the clamping portions may be integral with the bracket, and the other of the clamping portions may be separate from the bracket, and the clamping portions may be secured together with fasteners.

The coupler may be configured to adjustably mount to the trailer frame rail for lateral position of the skirt panel on the trailer. In addition, the track is configured for slidable movement with respect to the tab so that the longitudinal position of the skirt panel can be adjustable when one or more skirt mounts are coupled to corresponding one or more trailer frame rails. The coupler may be a generally planar extension of the bracket that can be coupled to the trailer frame rail with one or more fasteners received through corresponding one or more openings in the extension. The side extension may be at least one generally vertical strengthening rib.

In another embodiment of the invention, the side skirt assembly comprises an elongated skirt panel; and one or more skirt mounts mounting the skirt panel to a corresponding one or more frame rails, the skirt mount including a coupler adjustably mountable to the frame rail in more than one position without any holes in the frame rail, whereby the skirt panel is mountable in more than one lateral position on the trailer.

The skirt panel may include a track extending along at least a portion of the length of the skirt panel, and the track and the skirt mount may be coupled together without any fasteners to hang the skirt panel on the skirt mount.

DESCRIPTION OF EMBODIMENTS OF THE INVENTION

Figure 1:
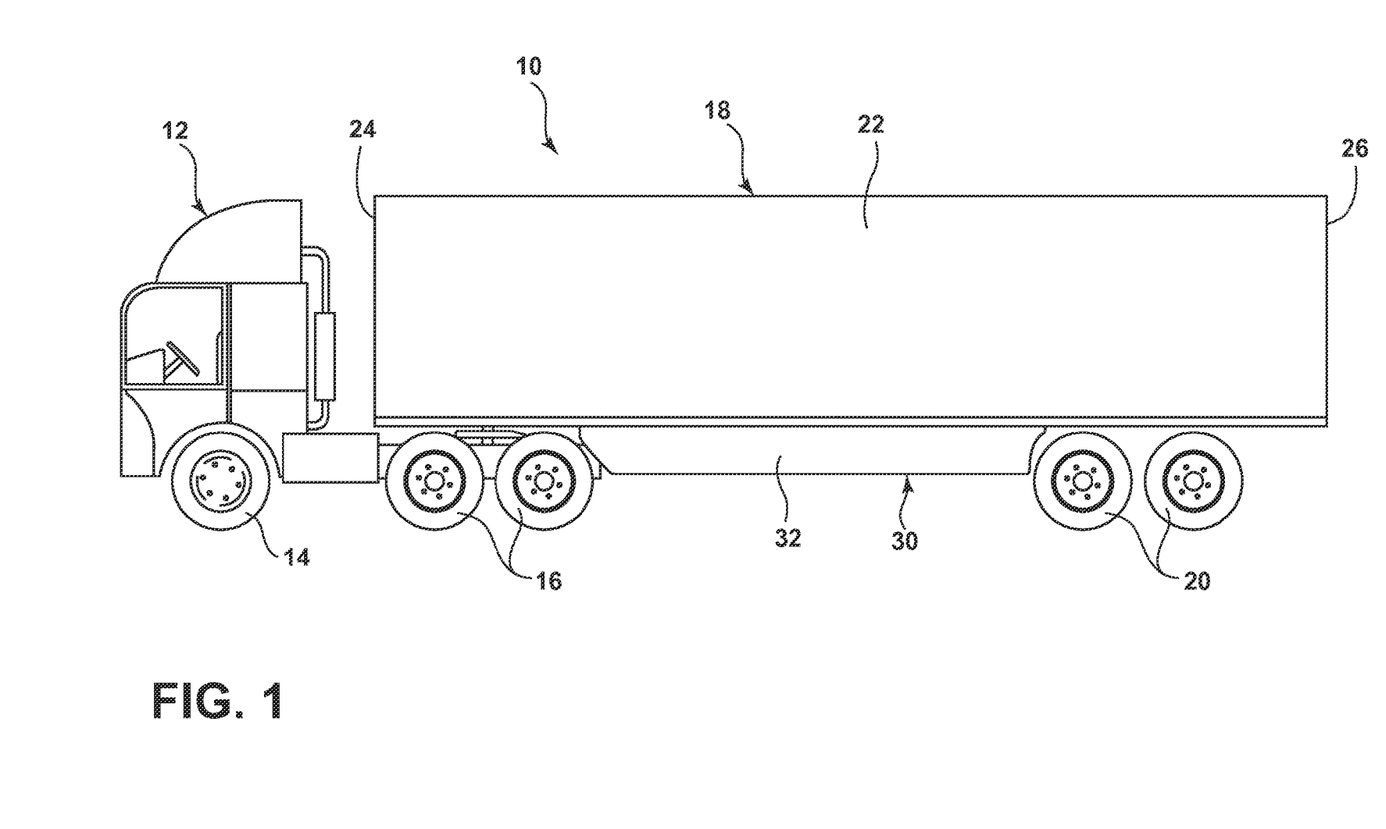
FIG. 1 is a schematic side view of a tractor-trailer having a tractor and a trailer with a side skirt mounted to the trailer according to one embodiment of the invention.

FIG. 1 schematically illustrates an exemplary tractor-trailer 10 having a tractor 12 supported by tractor front and rear tires 14, 16 and connected to a trailer 18 supported by trailer tires 20. The trailer 18 includes a pair of opposing side walls 22, one of which is viewable in FIG. 1, joined at front and rear ends by a front wall 24 and a rear wall 26, respectively. Additionally, an elongated side skirt 30 mounted to and depending from the trailer 18 forward of the tires 20 improves the aerodynamics of the tractor-trailer 10. The skirt 30 has an outer side 32 facing away from the trailer 18 and an inner side 34 (FIG. 2) facing toward the trailer 18. The invention relates to an assembly comprising the side skirt 30 and the structure for mounting the side skirt 30 to the trailer 18, and it is to be understood that the assembly or selected parts thereof can be employed with any suitable type of vehicle, including any suitable type of tractor-trailer, and the tractor-trailer 10 shown in the figures is provided for illustrative purposes only.

Figure 2:
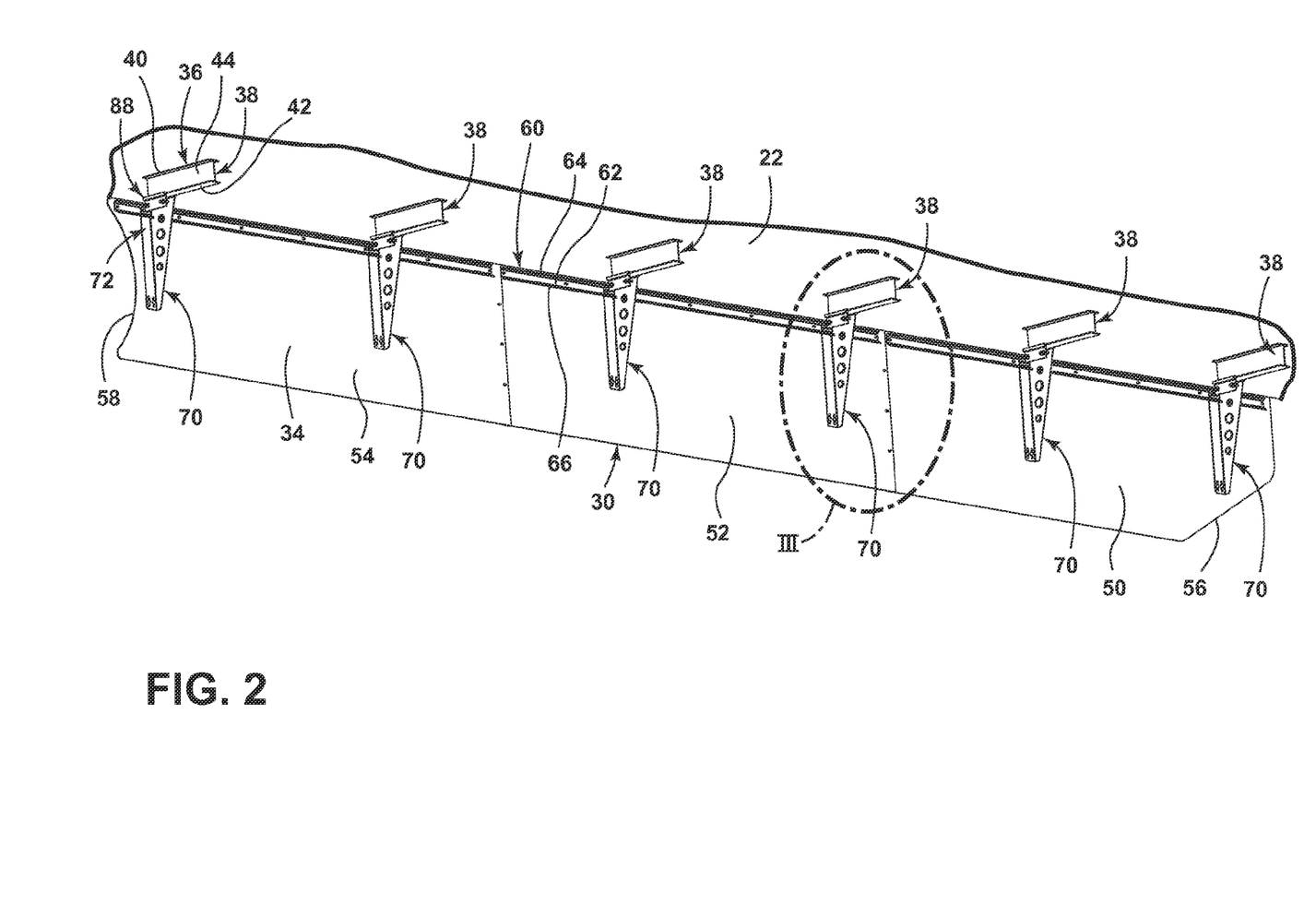
FIG. 2 is a perspective view of the underside of the tractor-trailer of FIG. 1 showing side skirt mounts according to one embodiment of the invention mounting the side skirt to the trailer.

Referring now to FIG. 2, which is a perspective view of the underside of the trailer 18 showing the inner side 34 of the side skirt 30, the bottom of the trailer 18 is formed by a frame 36 having a plurality of rails 38, such a I-beams, as shown, or other suitable types of rails, including box steel rails or C-shaped open tubes, extending laterally between the side walls 22 for supporting a floor (not shown). The illustrated rails 38 in the form of I-beams have upper and lower flanges 40, 42 joined by a web 44.

With continued reference to FIG. 2, the side skirt 30 is generally planar and formed by a plurality of sections. While the side skirt 30 can include any suitable number of sections, depending on the total length of the side skirt 30 and the length of the individual sections, the illustrated embodiment has three sections, a front section 50, a middle section 52, and a rear section 54. The front, middle, and rear sections 50, 52, 54 overlap along their adjoining edges and are secured together by mechanical fasteners, such as bolts. Alternatively, the adjoining edges can abut one another or be spaced from one another rather than overlapping. While the front, middle, and rear sections 50, 52, 54 can have any suitable shape, the middle section 52 is generally rectangular, and the front and rear sections 50, 54 have a similar shape, except that the front section 50 has a chamfer 56 joining its front and bottom edges, and the rear section 54 has an arc 58 for its rear edge joining the top and bottom edges.

Figure 2A:
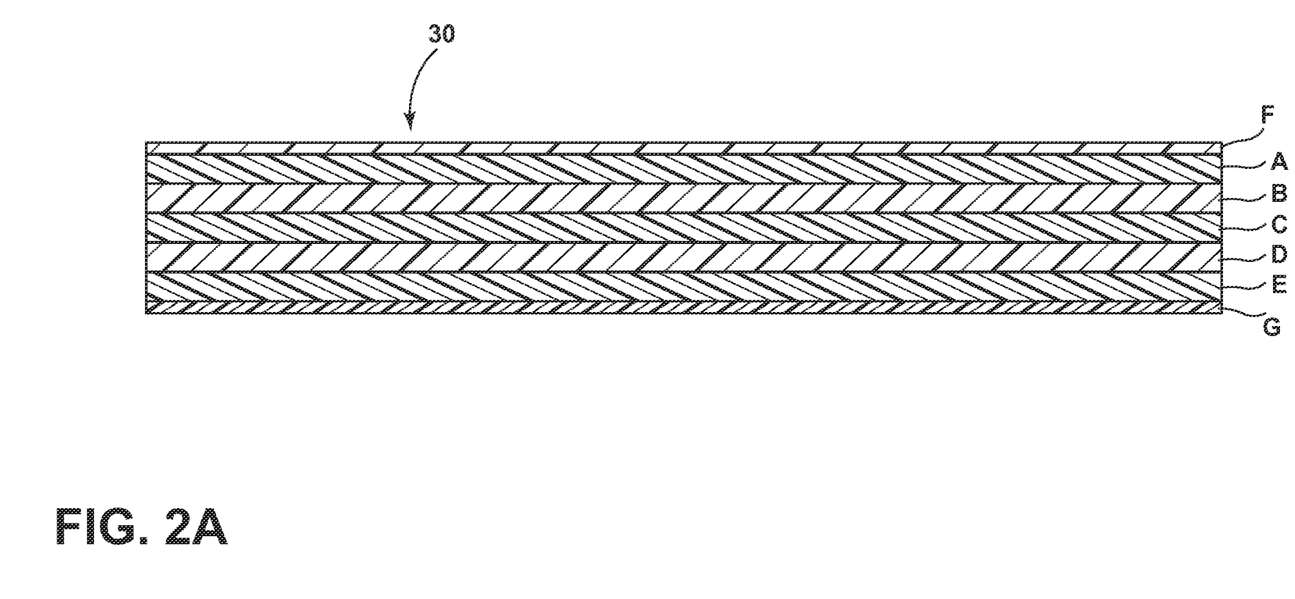
FIG. 2A is a sectional view of the side skirt of FIG. 2 showing an exemplary layered composite structure of the side skirt according to one embodiment.

The side skirt 30, according to one embodiment, is constructed from a composite of alternating layers of fiberglass and layers containing recycled fiberglass. In one exemplary embodiment, which is illustrated in FIG. 2A, the composite has five layers having the following configuration: fiberglass A/recycled fiberglass B/fiberglass C/recycled fiberglass D/fiberglass E. In another exemplary embodiment, the composite has three layers having the following configuration: fiberglass A/recycled fiberglass B/fiberglass C. The fiberglass layers may comprise resin-impregnated fiberglass. Further, the fiberglass layers may have any suitable type of glass fiber orientation, such as a bi-axial or bi-directional fiberglass, including 0/90 and 90/0 fiberglass, as well as 45/45 fiberglass. The recycled fiberglass layers may comprise ground up scraps of resin-impregnated fiberglass bound together with a resin. In addition, the layered composite side skirt 20 may include a layer of ultraviolet (UV) protective film F on an outermost side to protect the side skirt 20 from damage and fading that can be caused by UV rays and a polymeric surface film layer G on an opposite side. When the layered composite has five of the fiberglass and recycled fiberglass layers, each fiberglass and recycled fiberglass layer may have a thickness of about 0.025-0.050 in. (0.0635-0.1270 cm), with the total thickness of the fiberglass and recycled fiberglass layers being about 0.125-0.250 in (0.3175-0.6350 cm). The thickness of any of the fiberglass and recycled fiberglass layers may be increased from these exemplary values when the number of the fiberglass and recycled fiberglass layers in the composite decreases. Additional examples of layered composites are provided in the following table:

The side skirt 30, when constructed of a layered composite, may have any suitable number of layers, materials for each layer, and layer thickness and is not limited to the above examples.

To manufacture the side skirt 30, the layers for the side skirt 30 may be stacked in the desired configuration and the stack or layup may be placed in a large oven. The layers may be heated according to a predetermined temperature schedule to heat the resins in the layers, thus joining the layers together. After the joined layers leave the oven, the material is cut to length to form the sections 50, 52, 54 of the side skirt 30.

Figure 3:
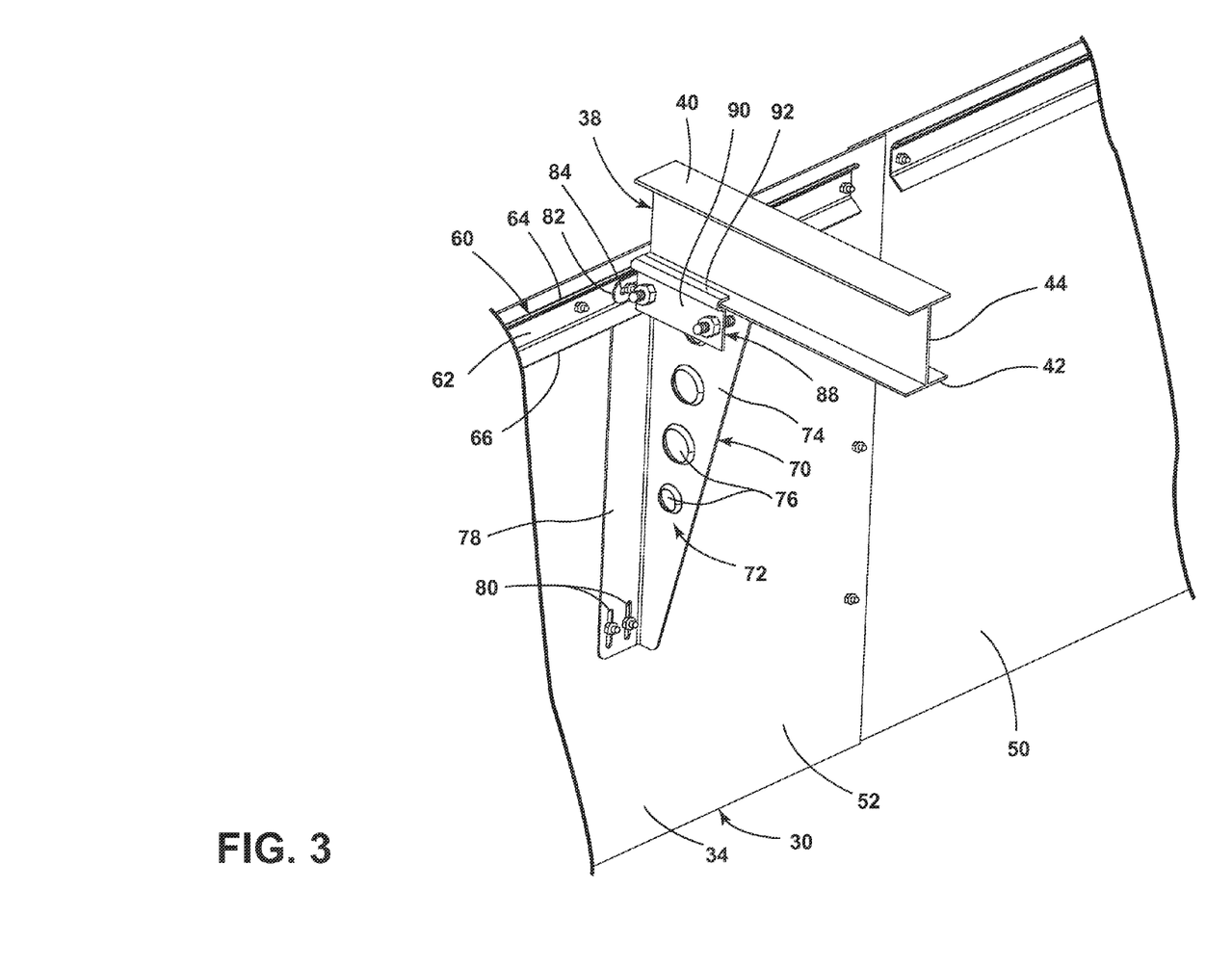
FIG. 3 is an enlarged view of the region identified as III in FIG. 2.

Referring back to FIG. 2, the side skirt 30 further includes an elongated hanging track 60 mounted to the inner side 34 of the skirt 30 adjacent or proximate the upper or top edge. In the exemplary embodiment, the track 60 is arranged generally parallel to the top edge of the skirt 30 along substantially the full length of the skirt 30 and separated into sections in accordance with the sections 50, 52, 54 of the skirt 30. As best seen in the enlarged view of FIG. 3, the track 60 has a planar central portion 62 between an upper angled portion 64 and a lower angled portion 66 such that the transverse cross-section of the track 60 has a generally U-shaped configuration. Suitable mechanical fasteners, such as bolts or rivets, mount the track 60 to the side skirt 30 at spaced intervals along the central portion 62 of the track 60.

A plurality of side skirt mounts 70 mount the side skirt 30 to the trailer 18. In the illustrated embodiment, the mounts 70 couple the side skirt 30 to the frame 36 of the trailer 18, particularly to the lower flange 42 of the rails 38. As best seen in the exploded view of FIG. 4 and the perspective view of FIG. 5, the side skirt mount 70 includes a bracket 72 having a generally triangular body 74 with weight-reducing circular apertures 76 formed therein. The body 74, in the illustrated embodiment, is a right triangle with a hypotenuse and two sides. A mounting portion 78 in the form of a wall disposed generally orthogonal to the body 74 along one of the sides includes a pair of elongated, vertically oriented apertures 80 at a lower end and a tab 82 at an upper end having a horizontally oriented aperture 84. A space 83 separates the tab 82 from the rest of the mounting portion 78 and communicates with a downwardly inclined slit 85 formed in the body 74. A clamping portion 86 disposed along the other side of the body 74 is configured to attach the bracket 72 to the trailer frame 36. As an example, the clamping portion 86 has the form of a C-shaped grip sized to grab onto a side of the lower flange 42 of the rails 38.

Figure 4:
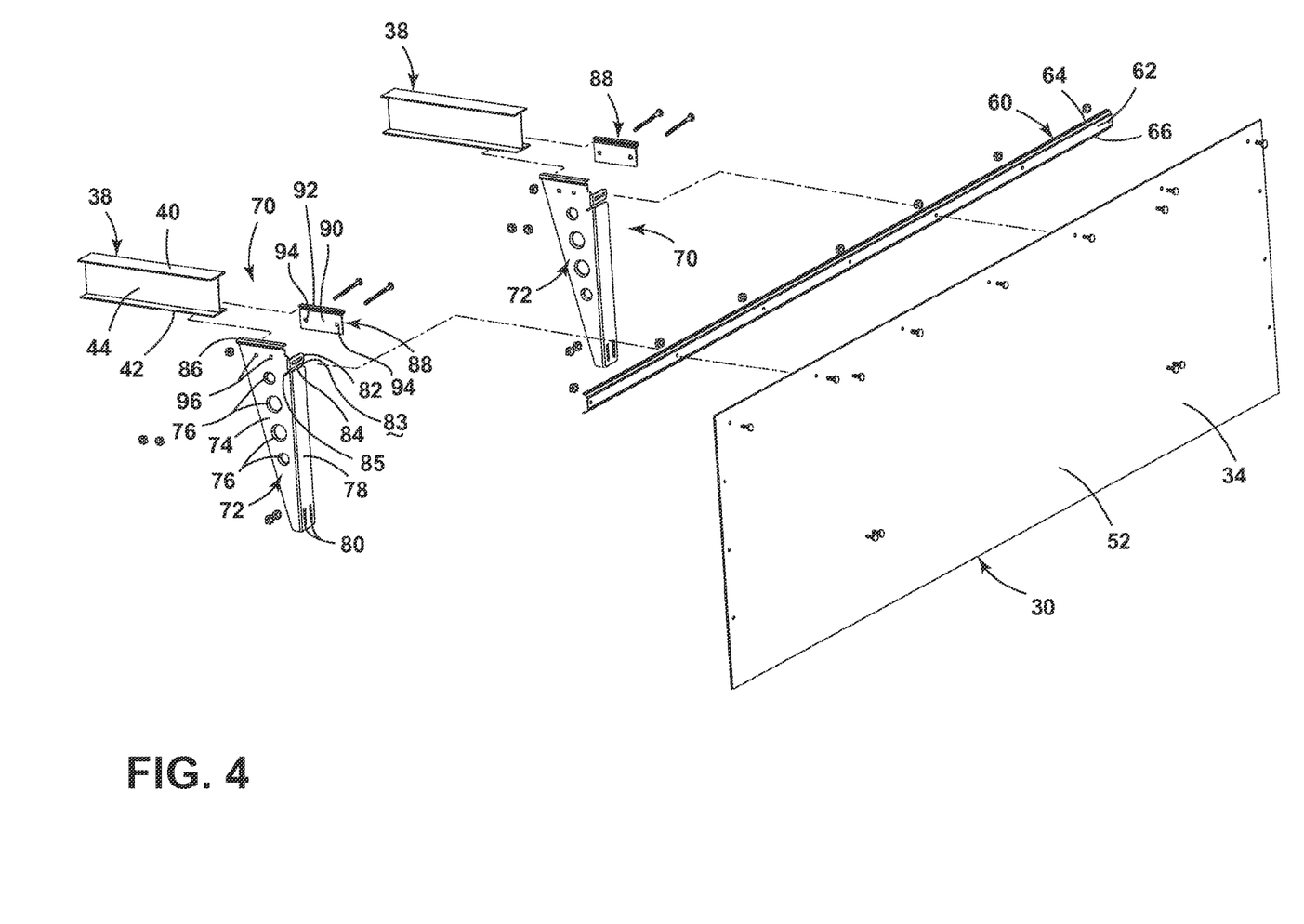
FIG. 4 is an exploded view of a middle section of the side skirt and corresponding side skirt mounts of FIG. 2.
Figure 5:
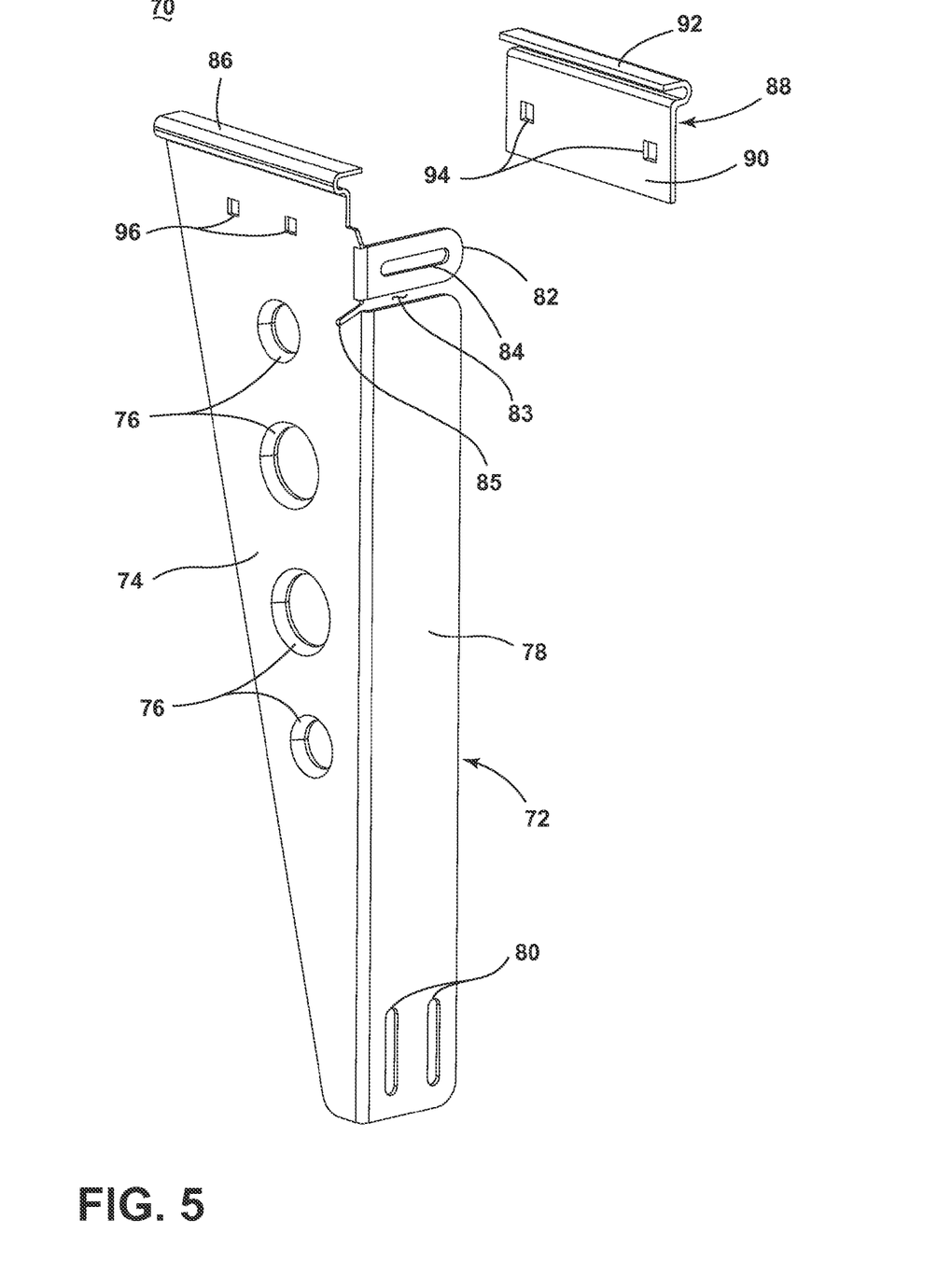
FIG. 5 is a perspective view a bracket and a clamp of the side skirt mount of FIG. 2.

In addition, the side skirt mount 70 includes an attachment member 88 that operates in conjunction with the clamping portion 86 of the bracket 72 to attach the bracket 72 to the trailer frame 38. The exemplary attachment member 88 has a

| Layers | Example 1 | Example 2 | Example 3 | Example 4 |
|---|---|---|---|---|
| Outer Layer | UV film - white | UV film - gray | UV film - white | UV film - gray |
| Layer 1 | 0/90 fiberglass | 0/90 fiberglass | [1]VERSITEX ® VX1 | VERSITEX ® VX1 |
| Layer 2 | Recycled fiberglass (0.040 in.) | Recycled fiberglass (0.040 in.) | [2]ECOTEX ® (0.100 in.) | ECOTEX ® (0.100 in.) |
| Layer 3 | 0/90 fiberglass | 0/90 fiberglass | VERSITEX ® VX1 | VERSITEX ® VX1 |
| Layer 4 | Recycled fiberglass (0.025 in.) | Recycled fiberglass (0.025 in.) | — | — |
| Layer 5 | 90/0 fiberglass | 90/0 fiberglass | — | — |
| Inner Layer | [3]FloLam ™ - white | FloLam ™ - gray | FloLam ™ - white | FloLam ™ - gray |

[1]VERSITEX is manufactured by U.S. Liner Company, a division of American Made, LLC. VERSITEX is a thermoplastic liner comprised of polypropylene resin reinforced with continuous bi-directional glass fiber.
[2]ECOTEX is manufactured by U.S. Liner Company, a division of American Made, LLC. ECOTEX is a reinforced sandwich constructed thermoplastic composite manufactured by laminating VERSITEX skins on to a chopped long fiber polypropylene and glass core (core is recycled).
[3]FloLam is a polypropylene and polyester scrim film manufactured and sold by Xamax Industries, Inc.

body 90 constructed of a generally rectangular plate that terminates at an upper end at a clamping portion 92 in the form of a C-shaped grip similar to that of the bracket clamping portion 86. Together, the opposing clamping portions 86, 92 constitute a coupler in the form a clamshell-type clamp configured to grab onto opposite sides of the lower flange 34 of the I-beam rails 38. Mechanical fasteners, such as bolts, inserted through openings 94, 96 in the attachment member 88 and the bracket 72 couple the attachment member 88 and the bracket 72, and a conventional spacer (not shown) can be employed with the fasteners to ensure a minimum spacing between the attachment member 88 and the bracket 72 and to prevent excessive tightening of the fasteners.

Referring back to FIG. 2, the installation of the side skirt 30 to the trailer 18 can occur section by section, if desired, and the following description assumes the installation occurs in this manner, with it being understood that the installation can proceed in any suitable manner or chronological order. Further, preferably, the track 60 is preassembled to the skirt 30 at the manufacturer, but if not, a user can mount the track 60 to the skirt sections 50, 52, 54 with the mechanical fasteners or the like.

To mount the side skirt 30 to the trailer 18 with the side skirt mounts 70, the user starts with one of the skirt sections 50, 52, 54, such as the front section 50. Next, the user arranges the front section 50 on the trailer 18 at the desired location. With the front section 50 arranged as such, the user attaches the bracket 72 of the side skirt mount 70 to the side skirt 30, particularly to the track 60 on the skirt 30. The bracket 72 attaches to the track 60 by placement of the tab 82 within the track 60 such that the tab 82 rests against the central portion 62 of the track 60. During placement of the tab 82 in the track 60, the lower angled portion 66 of the track 60 enters the space 83 between the tab 82 and the rest of the mounting portion 78 and the slit 85 on the bracket body 74. With the tab 82 in the track 60 and the lower angled portion 66 of the track 60 in the slit 85, the rest of the mounting portion 78 abuts the inner side 34 of the side skirt 30. Because of this configuration, the side skirt 30 essentially hangs on the bracket 72 even though the bracket 72 and the skirt 30 are not yet attached by fasteners. This allows the user to position the side skirt 30 as desired on the trailer 18 and hold the side skirt 30 in position while attaching the mount 70 to the trailer 18 without requiring the help of another person. To attach the mount 70 to the trailer 18, the user places the clamping portion 86 of the bracket 72 onto the lower flange 42 of one of the rails 38. The user then arranges the attachment member 88 on the other side of the rail 38 with the clamping portion 92 on the lower flange 42 opposite the bracket clamping portion 86 and couples the attachment member 88 to the bracket 72 with the fasteners having the optional spacers through the openings 94, 96. The user tightens the fasteners an amount sufficient to securely retain the clamping portions 86, 92 on the rail 38 and, thereby, the side skirt mount 70 on the rail 38. The process is repeated for a second side skirt mount 70 on the front section 50. The mounting of the three sections of the side skirt can take place with one person, as explained above, or two persons, if desired. The side skirt assembly is designed so that all three panels can be easily assembled by one person.

In an alternative process, two brackets 72 can be first mounted to the trailer rails at the appropriate trailer location that may be determined by snapping a chalk line from the back to the front of the trailer. The brackets 72 can be loosely clamped to the trailer rails 38 with the attachment member 88 and appropriate fasteners in the manner discussed above. The front section 50 can then mounted to the two brackets 72 and then adjusted both longitudinally and laterally on the trailer. The lateral adjustment can be accomplished by moving the brackets along the trailer rails 38, such as by sliding, until the front section 50 is aligned with the chalk line on the rails 38. Longitudinal adjustment can be accomplished by moving the front panel 50 forwardly or rearwardly within the slit 85. During such movement, the track 60 slides relative to the tabs 82 on the brackets 72. When the front section 50 is in the proper location, the fasteners that hold the brackets 72 and attachment members 88 can then be tightened to firmly secure the brackets 72 to the trailer rails 38. The other two sections 52 and 54 can then be installed in a similar manner. This process may facilitate installation of the side skirt by one person.

The above process for the front section 50 is repeated for the middle section 52 adjacent to the front section 50, with the middle section 52 arranged to overlap the front section 50 a predetermined amount, such as about two inches. After the side skirt mounts 70 are arranged to hold the middle section 52 to the trailer 18, the user couples the front section 50 and the middle section 52, such as by mechanical fasteners, including bolts and the like.

Again, the above process for the front section 50 is repeated for the rear section 54 adjacent to the middle section 52, with the rear section 54 arranged to overlap the middle section 52 a predetermined amount, such as about two inches. After the side skirt mounts 70 are arranged to hold the rear section 54 to the trailer 18, the user couples the middle section 52 and the rear section 54, such as by mechanical fasteners, including bolts and the like.

With all of the sections 50, 52, 54 mounted to the trailer 18 with the side skirt mounts 70, the user then installs mechanical fasteners, such as bolts, in the vertical apertures 80 at the lower end of the bracket mounting portion 78. The user can drill through the side skirt 30 to provide openings for the fasteners if needed. Preferably, the fasteners are positioned in the center of the apertures 80 so that the fasteners may slide within the apertures 80 to accommodate movement of the side skirt 30 upon impact with an obstacle. This process is repeated for all of the side skirt mounts 70. Finally, the user drills through the track 60 and the side skirt 30 to provide an opening for a fastener through the horizontal aperture 84 on the bracket tab 82 and then installs the fastener to fix the tab 82 to the track 60. This process can take place for all of the side skirt mounts 70 or for a selected number of the side skirt mounts 70, such as for the side skirt mounts 70 at the ends of the skirt 30 (i.e., the first and last side skirt mounts 70).

Figure 6:
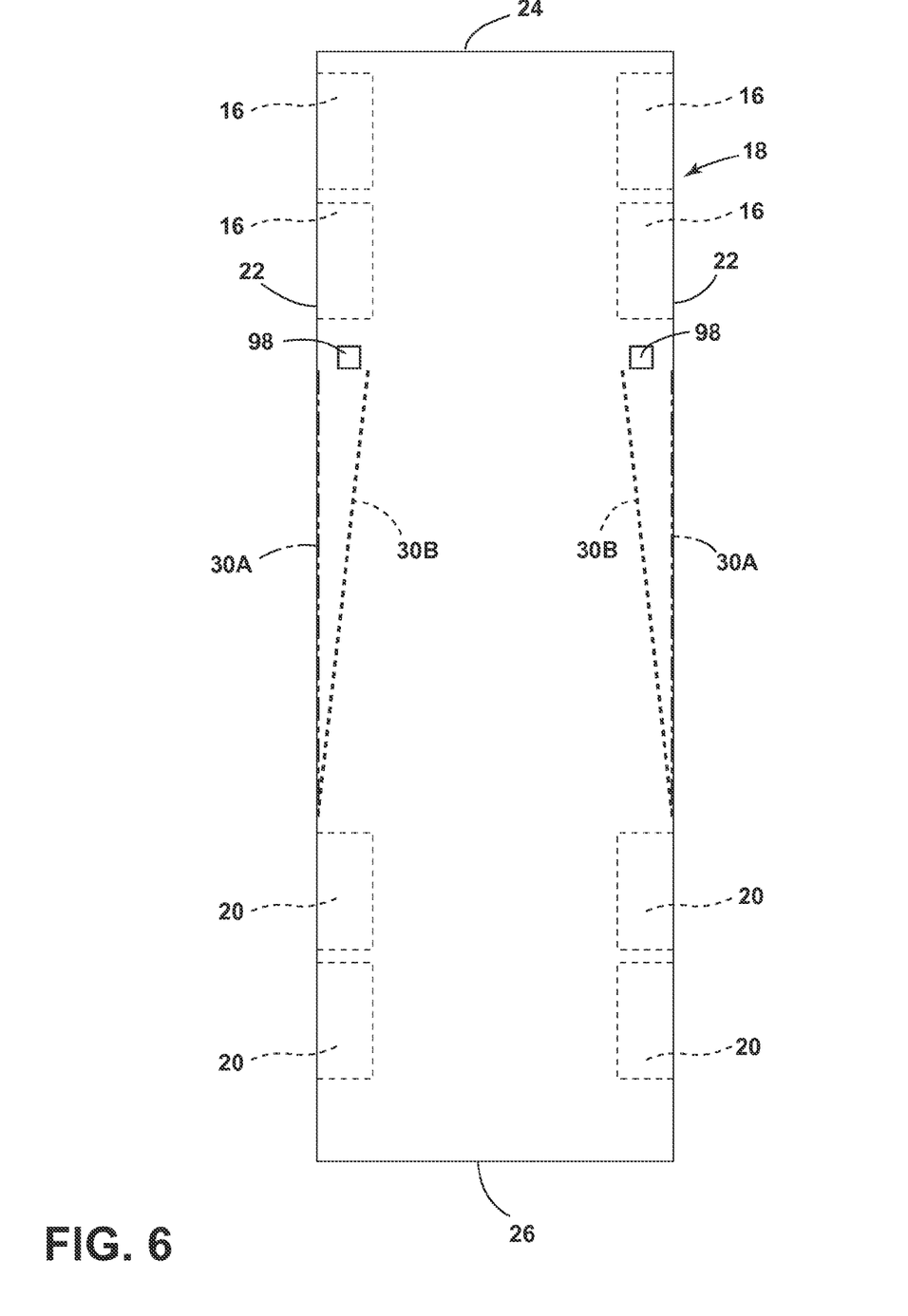
FIG. 6 is a schematic view of the bottom side of the trailer showing a straight and an angled orientation for the side skirt of FIG. 2.

The side skirt mount 70 is designed to have sufficient flexibility to be capable of mounting the side skirt 30 to the trailer 18 in multiple orientations. For example, as illustrated schematically in FIG. 6, the side skirt 30 can be mounted in a straight configuration A (dash-dot-dash line) and an angled configuration B (dashed line) using the same side skirt mounts 70. In one embodiment, the straight configuration A can correspond to the side skirt 30 extending generally parallel and possibly coplanar with the trailer side walls 22 between the tractor rear wheels 16 and the trailer wheels 20. As another example, the angled configuration B can correspond to aligning the ends of the skirt 30 so that the front end is near one landing gear 98 of the trailer 18 and the rear end is near the trailer side wall 22 at the trailer wheels 20. The straight and angled configurations A, B are two examples of orientations for the side skirt 30, and it is to be understood that the side skirt 30 can have any suitable length and location on the trailer 18 to achieve desired aerodynamic properties.

Advantageously, the side skirt mounts 70 do not require any holes in the frame 36 to secure the mounts 70 to the trailer 18, so the side skirt mounts 70 can be adjustably mounted on the rails 38 in any suitable position without drilling holes in the rails 38 or being limited to positions that already have holes. This is possible because the side skirt mounts 70 clamp onto the rails 38 rather than being coupled by mechanical fasteners that extend through holes in the rails. The side skirt mounts 70 may be modified to have an alternative type of coupler that does not require holes in the rails to achieve this benefit.

The track 60 on the side skirt 30 and the skirt mounts 70 thus provide a mounting that enables one person to assemble the entire side skirt assembly. The brackets 72 hold the panel sections 50, 52 and 54 in place while the panels are being installed. The side skirt assembly can be easily shipped, stored and manipulated for assembly on the trailer and in a preferred location. The assembly attaches to the trailer without requiring drilling holes in the trailer rails. The standard hardware can be used for angled or side rail installation with the same basic installation procedure set forth above. The extruded composite panels are flexible enough to bend over obstacles that may be encountered in use. In addition, each panel is replaceable independently. In addition, the hanging brackets 72 and attachment members 88 can be easily replaced if damaged in service. The parts are selected to perform well in all typical temperatures experienced in the field of service.

While the side skirt mount 70 has been described and illustrated as being mounted to the rails 38 of the trailer frame 36, it is within the scope of the invention for the mount 70 to be mounted to other parts of the trailer 18 or to other types of trailers having different types of frames or structures other than frames. The mount 70 can easily be adapted by reconfiguring the clamping portions 86, 92 of the bracket 72 and the attachment member 88. Further, the mount 70 can be modified to employ a different type of coupler rather than a clamp coupler, including a simple coupler having mechanical fasteners securing the mount 70 to the trailer 18.

Figure 7:
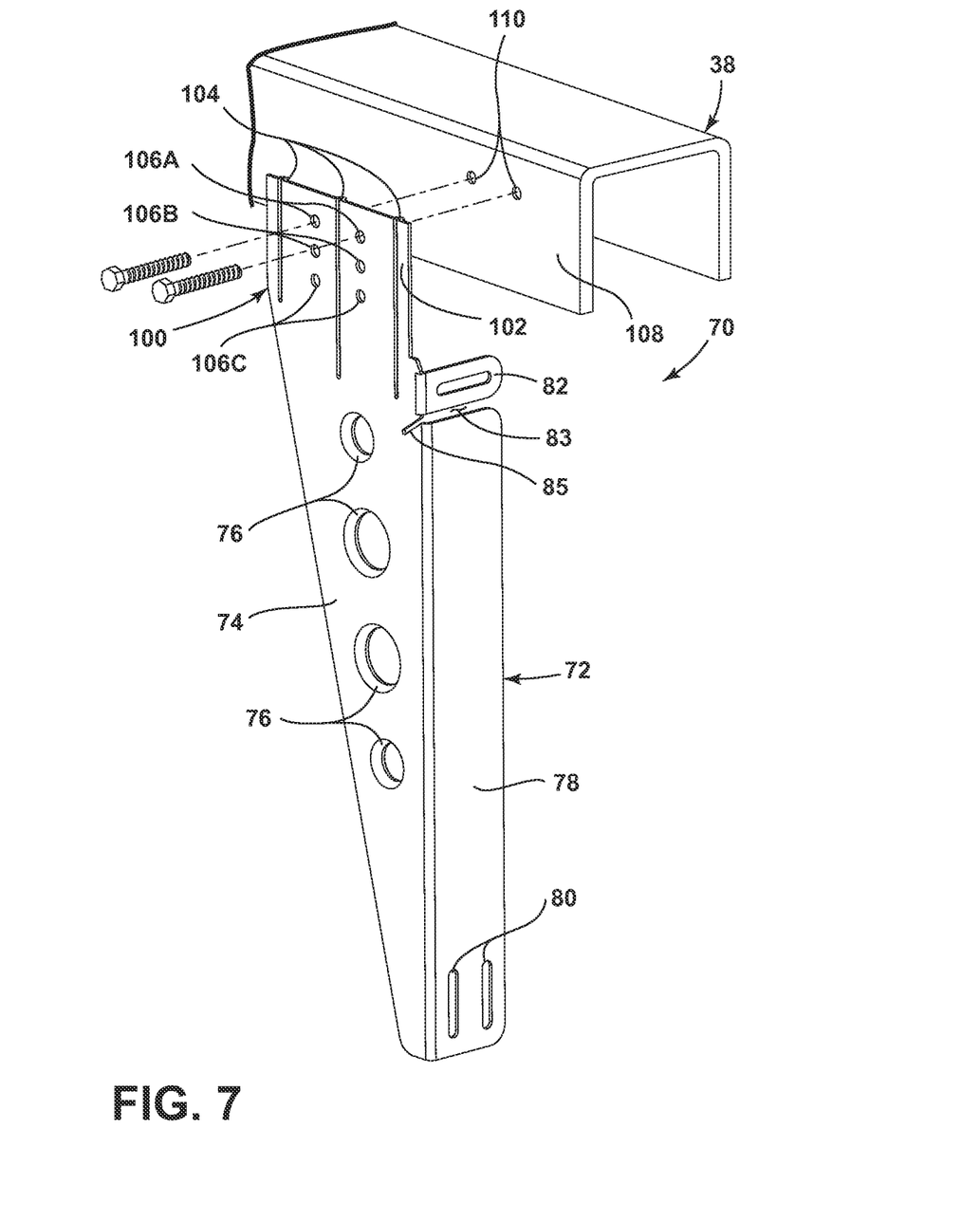
FIG. 7 is a perspective view of an alternative side skirt mount according to another embodiment.

As an example, FIG. 7 illustrates an alternative side skirt mount 70 having an alternative coupler 100. The mount 70 is identical to the skirt mount 70 of the previous embodiment in all respects other than the structure for attaching the mount 70 to the trailer frame 36. The coupler 100 includes a generally planar extension 102 projecting upwardly from and coplanar with the bracket body 74. Optionally, the extension 102 can include a plurality of strengthening ribs 104 extending generally vertically downward from the upper edge of the extension 102. Such ribs 104 reinforce the mount 70 so that the mount 70 will resist bending in response to a side load. Pairs of openings 106A, 106B, 106C are arranged vertically on the extension 102, with the openings in one pair horizontally spaced from each other, for receipt of fasteners, such as bolts, that attach the mount 70 to the trailer frame rail 38. For example, if the rails 38 are U-shaped or C-channel beams, the extension 102 is placed against a flat side 108 of the rail 38, and the fasteners extend through one set of the openings 106A, 106B, 106C, depending on the desired position of the mount 70 on the rail 38, and through corresponding openings 110 on the rail 38.

The assembly of the side skirt assembly to the trailer 18 with the alternative skirt mounts 70 can occur in the same manner as described above, except that the coupling of the skirt mounts 70 to the rails 38 takes place by the user inserting the fasteners through the desired set of openings 106A, 106B, 106C on the skirt mount 70 and the openings 110 on the rail 38. If the openings 110 on the rail 38 are not present in the desired location for the lateral positioning of the side skirt 30, then the user can drill the openings 110 in the rail 38.

The assembly of the side skirt 30 and the side skirt mount 70 has been described in conjunction with several mechanical fasteners to couple various components, but the assembly is not intended to be limited to use of such mechanical fasteners, and other types of fasteners and fastening methods, such as adhesives, are acceptable for use with the assembly.

Additionally, the side skirt 30 may be used with any type of skirt mount and is not limited to use with the exemplary skirt mounts 70 described herein. Similarly, the skirt mounts 70 may be employed to mount any type of side skirt to a trailer and are not limited for use with the side skirt 30 described herein.

While the invention has been specifically described in connection with certain specific embodiments thereof, it is to be understood that this is by way of illustration and not of limitation, and the scope of the appended claims should be construed as broadly as the prior art will permit. Reasonable variation and modification are possible with the scope of the foregoing disclosure and drawings without departing from the spirit of the invention defined in the appended claims. Hence, specific dimensions and other physical characteristics relating to the embodiments disclosed herein are not to be considered as limiting, unless the claims expressly state otherwise.

What is claimed is:

1. A side skirt assembly for attachment to a trailer of a tractor-trailer, particularly to a trailer frame comprising lateral frame rails extending between sides of the trailer, the side skirt assembly comprising:
    an elongated skirt panel having an inner surface and an outer surface;
    an elongated track mounted to the skirt panel on the inner surface thereof proximate an upper edge of the skirt panel and extending at least a portion of the length of the skirt panel;
    one or more skirt mounts configured to mount the skirt panel to a corresponding one or more or of the frame rails, the skirt mount including a bracket with a tab that is received within the elongated track for attaching the one or more skirt mounts to the skirt panel;
    a fastener for securing the tab to the elongated track; and
    one or more couplers for mounting the one or more skirt mounts to the corresponding one or more of the frame rails.

2. The side skirt assembly of claim 1 wherein the elongated track comprises a generally flat central portion that is configured to slidably receive the tab and a lower angled portion that projects downwardly and away from the inner surface, and the bracket has a body that extends generally perpendicular to the tab and includes an upwardly opening slit extending into the body adjacent the tab, wherein, when the tab is positioned in the track at the central portion thereof without being fastened thereto, and the lower angled portion of the track is received in the slit, the skirt panel is slidably supported on the skirt mount.

3. The side skirt assembly of claim 2 wherein the bracket further includes a wall generally perpendicular to the body and below the tab, wherein the tab and the wall form a space therebetween in communication with the slit such that the track lower angled portion can enter the slit through the space.

4. The side skirt assembly of claim 3 wherein the tab and the wall both include at least one opening and the bracket can be secured to the skirt panel with fasteners that extend through the openings.

5. The side skirt assembly of claim 1 wherein the coupler comprises a pair of clamping portions that clamp onto one of the trailer frame rails.

6. The side skirt assembly of claim 5 wherein the clamping portions each include a C-shaped grip that are received onto a side of a lower flange of an I-beam type trailer frame rail.

7. The side skirt assembly of claim 6 wherein one of the clamping portions is integral with the bracket, and the other of the clamping portions is separate from the bracket, and the clamping portions are secured together with fasteners.

8. The side skirt assembly of claim 1 wherein the coupler is configured to adjustably mount to the trailer frame rail to adjust the lateral position of the skirt panel on the trailer.

9. The side skirt assembly of claim 1 wherein the track and the one or more skirt mounts are configured so that the track is slidably mounted to the one or more skirt mounts prior to fastening the skirt panel to the one or more skirt mounts such that the longitudinal position of the skirt panel is adjustable when the one or more skirt mounts are coupled to the corresponding one or more of the frame rails for adjusting the position of the skirt panel with respect to the frame rails during assembly of the skirt panel to the frame rails.

10. The side skirt assembly of claim 1 wherein the bracket further comprises a body having a generally right triangular shape with two sides orthogonal to each other, and the tab and the coupler are located on different sides of the body.

11. The side skirt assembly of claim 1 wherein the coupler comprises a generally planar extension of the bracket that can be coupled to the trailer frame rail with one or more fasteners received through corresponding one or more openings in the extension.

12. A side skirt assembly for attachment to a trailer of a tractor-trailer, particularly to a trailer frame comprising lateral frame rails extending between sides of the trailer, the side skirt assembly comprising:
   an elongated skirt panel having an inside surface, an outside surface and a top edge along the length of the skirt panel;
   an elongated track mounted to the skirt panel on the inside surface thereof proximate an upper edge of the skirt panel and extending at least a portion of the length of the skirt panel;
   one or more skirt mounts mounting the skirt panel to a corresponding one or more of the frame rails, the skirt mount including a coupler configured for adjustably mounting to the frame rail in more than one position without any holes in the frame rail; and
   the one or more skirt mounts is/are slidably coupled to the elongated track, wherein the longitudinal position of the skirt panel with respect to the trailer can be adjusted prior to fastening the elongated skirt panel to the one or more skirt mounts.

13. The side skirt assembly of claim 12 wherein the coupler comprises a clamp that is configured to clamp onto the trailer frame rail.

14. The side skirt assembly of claim 12 wherein the one or more skirt mounts includes a tab slidable within the track, and a fastener extending through the tab and the track to fix the track and the skirt panel in a desired longitudinal position.

* * * * *